United States Patent [19]

Engelhard et al.

[11] 4,287,262
[45] Sep. 1, 1981

[54] PROCESS FOR THE PRODUCTION OF LAMINATE SYSTEMS FROM A LOW DENSITY POLYETHYLENE COATING RESIN

[75] Inventors: Forest Engelhard, Dormagen; Rainer Kuhn, Odenthal; Wichard Pump, Mülheim; Reinhard Riess, Bergisch-Gladbach; Hugo Streib, Krefeld, all of Fed. Rep. of Germany

[73] Assignee: Bayer Aktiengesellschaft, Leverkusen, Fed. Rep. of Germany

[21] Appl. No.: 99,146

[22] Filed: Nov. 30, 1979

[30] Foreign Application Priority Data

Dec. 8, 1978 [DE] Fed. Rep. of Germany ....... 2853069

[51] Int. Cl.³ .............................................. B32B 15/08
[52] U.S. Cl. ................................... 428/461; 428/523; 428/462; 526/65
[58] Field of Search ....................... 428/461, 523, 462; 526/65

[56] References Cited

U.S. PATENT DOCUMENTS

| | | | |
|---|---|---|---|
| 3,816,230 | 6/1974 | Carreras et al. | 428/462 |
| 4,158,718 | 6/1979 | Kehl et al. | 428/461 |
| 4,172,915 | 10/1979 | Sheptak | 428/461 |

OTHER PUBLICATIONS

"Protective Cover for Cable on Reels," *Western Electric Technical Digest*, Woodward, No. 47, p. 15, Jul. 1977.

Primary Examiner—Marion E. McCamish
Assistant Examiner—E. Rollins Buffalow
Attorney, Agent, or Firm—Sprung, Felfe, Horn, Lynch & Kramer

[57] ABSTRACT

Laminate systems with improved bond strength prepared by coating of flexible substrates with low density polyethylene and a process for preparing said laminate systems are claimed which are characterized in that a polyethylene is used as a coating resin, which is obtained if (a) two autoclaves are connected in series such that all the reaction product of the first reactor is transferred to the second reactor, (b) a length-/diameter ratio (L/D) of 1:1 to 3:1 is chosen for each autoclave, (c) the monomer feed stream is distributed between the two reactors such that the monomer feed stream to the first reactor is the same as or greater than the monomer feed stream to the second reactor, (d) the reaction temperatures in the two autoclaves are adjusted such that the reaction temperature in the first reactor is lower than the reaction temperature in the second reactor, (e) the initiator chosen for the first reactor is the same as or different from the initiator chosen for the second reactor, and which has a density of 0.915 to 0.930 g/cm³ and a melt index (190° C./2.16 kp) of 0.2 to 20 g/10 minutes is employed as the coating resin.

6 Claims, 3 Drawing Figures

PROCESS FOR THE PRODUCTION OF LAMINATE SYSTEMS FROM A LOW DENSITY POLYETHYLENE COATING RESIN

The present invention relates to a process for the production of laminate systems with improved bond strength by coating flexible substrates with low density polyethylene (LDPE) as the coating resin.

It is already known to produce laminate systems by the extrusion coating of flexible substrates such as paper, cardboard, aluminium foil, cellophane, polyamide, polypropylene, polyester and the like, and of multi-layer combinations formed from these materials, using low density polyethylene as the coating resin (compare Kunststoff-Handbuch (Plastics Hanbook) volume IV, Polyolefins, Hanser-Verlag, Munich 1969, page 411 et seq.).

Such laminate systems are employed in the production of industrial finished products, such as photographic paper, disposable crockery and the like, and above all as a packing material for the packaging of solid substances and liquids. Diverse laminate systems are produced on a large scale for, above all, the packaging of foodstuffs, such as milk drinks and fruit juice drinks, frozen foods, cheese, meat, coffee, bakery products and the like, an aluminium foil frequently being a constituent of the laminate system, as a barrier layer against passage of light and oxygen through the packaging.

Extrusion coating with low density polyethylene is one of the essential process steps in the production of laminate systems, and is carried out either to bond two flexible substrates, such as, for example, cardboard and aluminium foil, to one another or to apply to a substrate, such as paper, cardboard, aluminium foil, cellophane, polyester, polyamide, polypropylene and others, and multi-layer combinations formed from these materials, a layer which is impermeable to liquid and can be heat-sealed (compare Kunststoff-Handbuch (Plastics Handbook), volume IV, Polyolefins, Hanser-Verlag, Munich 1969, page 411 et seq.).

In this procedure, in accordance with the processes known hitherto, the coating resin is melted in an extruder, extruded as a thin melt film (web) through a coating die onto the fed substrate or substrates, pressed onto the substrate in a nip, formed by chill roll and a pressure roll and at the same time cooled (compare Kunststoff-Handbuch (Plastics Handbook), volume IV, Polyolefins, Hanser-Verlag, Munich 1969, page 411 et seq.).

For extrusion coating of the most diverse substrates, the polyethylene as the coating resin must essentially fulfil the following requirements (compare Converting Industry 5 (1968), 2-9 and 6 (1968), 2-14):

the flowability and the stability to heat at the high processing temperatures and shearing forces used must be adequate, the drawability of the extruded film at high takeoff rates must be good, constriction, and edge-thickening resulting therefrom, of the extruded film must be slight (so-called "Neck-In", measured as the difference between the die width and the coating width).

the sealability must be good and there must be very good bond strength between the substrate and the polyethylene layer.

Of these requirements, the bond strength between the polyethylene layer and, in particular, aluminium foil as the substrate is a critical factor which determines the quality of the laminate system as a packing material. In order to achieve good bond strength to the aluminium foil even in contact with liquid packaged materials, that is to say a high so-called "wet bond strength", it is necessary for the hot polyethylene web to undergo a certain oxidation, by contact with atmospheric oxygen, during the extrusion coating. On the other hand, the resulting degree of oxidation of the polyethylene layer in the finished laminate system must not be so high that the sealability of the polyethylene layer is reduced or that the odour or flavour of the packaged material is impaired.

Oxidation of the polyethylene web is thus to be restricted, as far as possible, to the substrate/polyethylene interface. According to the processes known hitherto, for example according to the process of DE-OS (German Published Specification) No. 1,910,743, this is achieved by exposure of the side of the polyethylene web facing the substrate to an ozone/air mixture, prepared by corona discharge, in the section between the die and the nip.

In spite of these measures, it has been proved in practice that it is not possible to fulfil to a sufficient extent the total number of the abovementioned requirements of the coating resin, and of these, in particular, the adequately good "wet bond strength" to aluminium foil, using the low density polyethylenes which are commercially available at present.

The present invention thus relates to a laminate system using, as the coating resin, a low density polyethylene coating resin with which all of the abovementioned requirements are fulfilled.

A process has namely been found for the production of laminate systems with improved bond strength by coating flexible substrates using, as the coating resin, low density polyethylene (LDPE) which has been prepared in autoclave reactors with virtually complete back-mixing under pressures of 800 to 3,000 bars and in the presence of initiators which form free radicals, characterised in that a low density polyethylene which is obtained if (a) two autoclaves are connected in series such that all the reaction product of the first reactor is transferred to the second reactor, (b) a length-/diameter ratio (L/D) of about 1:1 to 3:1 is chosen for each autoclave;

(c) the monomer feed stream is distributed between the two reactors such that the monomer feed stream to the first reactor is equal to or greater than the monomer feed stream to the second reactor, (d) the reaction temperatures in the two autoclaves are adjusted such that the reaction temperature in the first reactor is lower than the reaction temperature in the second reactor, (e) the initiator chosen for the first reactor is the same as or different from the initiator chosen for the second reactor, and which has a density of 0.915 to 0.930 g/cm$^3$ and a melt index (190° C./2.16 kp) of 0.2 to 20 g/10 minutes is employed as the coating resin.

The laminate systems with improved bond strength according to the invention are produced by extrusion coating of flexible substrates, such as paper, cardboard, cellophane, polyamide, polypropylene, polyester and others, and of multi-layer combinations formed from these materials, using the low density polyethylene according to the invention as the coating resin. The bond strength between the substrate and the polyethylene layer applied by extrusion coating is thus improved to the extent that especially the so-called "wet bond strength" of at least 350 p/25 mm (initial value) or 500 p/25 mm (level 30 days after preparation) generally required in practice, for the coating of aluminium foil/cardboard laminates, is exceeded.

The coating of flexible substrates with low density polyethylene is effected by extrusion coating by processes which are in themselves known, on coating units, the components of which essentially consist of equipment for unwinding the substrate to be coated, extruder with an extrusion coating die for melting the polyethylene and extruding the polyethylene web, station for ozone treatment of the polyethylene web, laminator, consisting of a chill roll and pressure roll, in the nip of which the polyethylene web is pressed onto the substrate, equipment for rewinding the coated substrate, and tension regulator.

The inventive process employing LDPE is characterised, in particular, in that also a polymer concentration profile is produced by establishing a temperature profile between the two autoclave reactors. Apart from the melt index and density, which can be regulated in a known manner by pressure, overall temperature and concentration of the chain transfer agent the molecular characteristics of long-chain branching, molecular weight distribution, short-chain branching and proportion of double bonds can additionally be adjusted by the temperature profile and concentration profile such that the abovementioned flow ability, drawability, "neck-in", sealability and, above all, bond strength, which are decisive parameters for coating resins, in total correspond to requirements in practice to an extent which has not hitherto been achieved.

As will be illustrated further in the examples, as the reaction temperature profile increase, in particular both the bond strength and the "neck-in" increase. Since too high a degree of "neck-in" can impair processing, it is advantageous to adjust the average reaction temperature difference between the two autoclaves to 20° to 60° C., in particular 40° to 50° C. The polyethylenes thus prepared have, in particular, a sufficiently good bond strength and at the same time a small degree of "neck-in".

Figure 1:
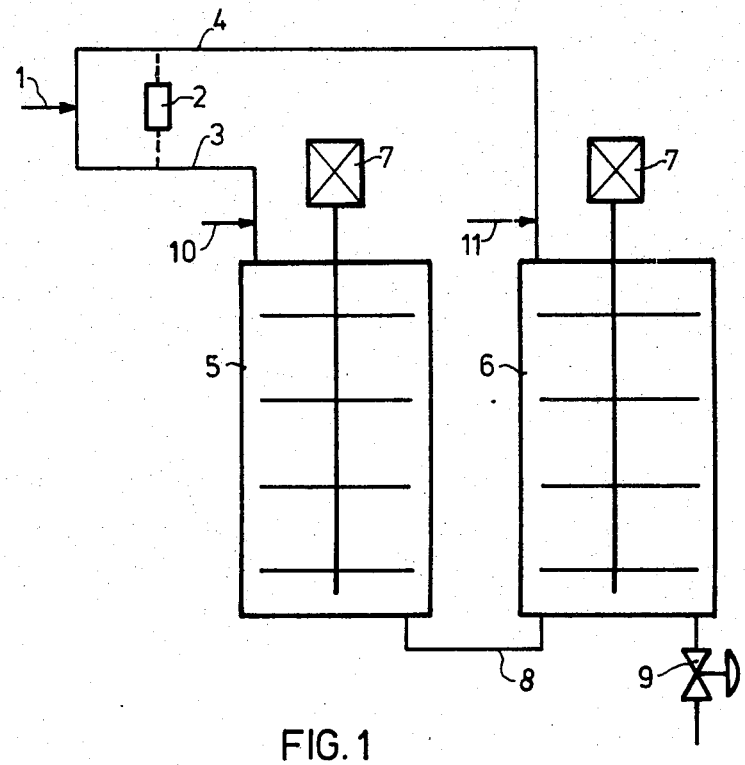
FIG. 1 illustrates a process of production of low density polyethylene.

The production of the low density polyethylene employed in the inventive process is illustrated in more detail as follows, with the aid of diagram 1:

The feed ethylene (1), which can contain co-monomers, such as vinyl acetate, but-l-ene and others, and chain transfer agents, such as hydrogen, ethane, propane and others and which is under a pressure of 800 to 3,000 bars and at a temperature of $-20°$ C. to 100° C., depending on the reaction requirements, is divided via a ratio regulator (2) into part streams (3) and (4), which pass to the reactors (5) and (6). (7) designates the stirrer drives.

The reaction mixture from reactor (5) passes via connecting line (8) into reactor (6), and the reaction mixture from reactor (6) passes via the pressure regulator (9) into devices for separating the reaction mixture.

The nature and amount of initiators (10) and (11) which are fed into part streams (3) and (4) immediately before entry of these streams into reactors (5) and (6) respectively are adapted to the particular reaction temperatures. Initiators used are, for example, tertiary butyl perisoctonoate, tertiary butyl pernonanoate, tertiary butyl perneodecanoate or tertiary butyl perpivalate.

The part streams (3) and (4) are adjusted such that $(3) \leq (4)$, and the reaction temperatures T1 and T2 (in reactor (5) and (6) respectively) are chosen so that T2 is always $>$ T1. Preferred temperature ranges for T1 and T2 are 120° to 220° C. for T1 and 190° to 280° C. for T2.

Two groups of products are particularly suitable for the extrusion coating, and the preferred group employed depends on the requirements and the extrusion equipment of the processor. One group includes types of polyethylene with melt indices of about 6–8 g/10 min. and densities of about 0.916–0.919 g/cm$^3$, and the other group includes those with melt indices of about 3–5 g/10 min. and densities of about 0.922–0.924 g/cm$^3$. Polyethylenes of both groups of products can be prepared and employed according to the invention.

The polyethylene employed in the invention can additionally contain additives, such as, for example, stabilisers, slip agents, anti-blocking agents, anti-static agents, carbon blacks, dyestuffs, pigments, flame retarding additives, inorganic and organic fillers, glass fibres, textile fibres and other polymers, such as, for example, high-density polyethylene, polypropylene, polybutene and copolymers of ethylene and vinyl esters and/or unsaturated acids and/or esters thereof and/or metal salts thereof.

The following examples are intended to illustrate the process according to the invention in more detail. The description of the examples according to Table 1 is arranged into (a) preparation of the high-pressure polyethylenes (b) extrusion coating procedure (c) testing the laminate systems with regard to oxidation, "neck-in" and bond strength, and (d) results.

TABLE 1

| Example | Monomer (1) tons/hour | Monomer ratio (3):(4) | chain transfer agents concentration, vol. %/type | Pressure bars | Reaction temperatures | | | Initiators | |
|---|---|---|---|---|---|---|---|---|---|
| | | | | | T$_1$ °C. | T$_2$ °C. | ΔT °C. | (10) | (11) |
| 1 | 113 | 2:1 | 1.4/C$_3$H$_6$ | 1,540 | 215 | 260 | 45 | PO[1] | PN[2] |
| 2 | 112 | 3:1 | 1.2/C$_3$H$_8$ | 1,680 | 260 | 260 | 0 | PN | PN |
| 3 | 118 | 3:1 | 0.4/C$_3$H$_6$ | 1,540 | 260 | 260 | 0 | PN | PN |
| 4 | 93 | 3:1 | 1.5/C$_3$H$_6$ | 1,530 | 200 | 260 | 60 | PO | PN |
| 5 | 81 | 3:1 | 1.6/C$_3$H$_6$ | 1,530 | 170 | 260 | 90 | PO | PN |

[1] tertiary butyl per-isooctanoate
[2] tertiary butyl per-nonanoate

EXAMPLES 1–5 (compare Table 1)

(a) Preparation of the low density polyethylenes.

The polyethylenes according to Examples 1–5 were synthesised in a high-pressure polymerisation unit with two virtually completely mixed stirred autoclaves, which are connected to one another according to the diagram shown in FIG. 1. Both autoclaves have a L/D ratio of 2:1; the volume ratio of the first to the second autoclave is likewise 2:1.

The polymerisation conditions, that is to say amount of feed ethylene (1), ratio of the monomer feed into the first reactor (5) to that into the second reactor (6) ((3) : (4)), chain transfer agent (concentration and type), pressure, reaction temperatures in the first and second reactor (T1 and T2), the temperature difference ($\Delta T$) and the initiators (10) and (11) are listed in Table 1.

(b) Extrusion coating procedure.

The same substrate to be coated, that is to say a previously prepared laminate built up from $PE_1$/cardboard/$PE_2$/aluminum was employed for all the examples and was coated, on the free aluminium side, with the polyethylene ($PE_3$) according to Examples 1–5. The resulting laminate, built up from $PE_1$/cardboard/$PE_2$/aluminium/$PE_3$, is used in practice as a packing material for packaging sterilized milk.

The extrusion coating unit used for the experiments and the coating conditions are described by the following data:

| | |
|---|---|
| substrate width: | 800 mm |
| substrate speed: | 150 m/min. |
| coating weight ($PE_3$): | 45 g/m² |
| extruder (Messrs. Er-We-Pa) | |
| screw diameter: | 4.5 g/m² |
| screw length: | 28 D |
| number of revolutions: | 172 minute$^{-1}$ |
| die (Messrs. Er-We-Pa) | |
| width: | 870 mm |
| opening: | 0.9 mm |
| distance from die to nip (air gap): | 155 mm |
| temperatures (°C.): | |
| screw: | 250, 260, 270, 290, 290 |
| adapter: | 290, 300 |
| die: | 290, 290, 300, 290, 290 |
| die lips: | 295 |
| melt: | 300 |
| laminator: | high-gloss chill roll surface, temperature: 14° C. |

Pre-treatment:

The aluminium surface of the substrate to be coated was pre-treated by means of corona discharge. The side of the extruded polyethylene web facing the substrate was exposed to ozone, coming from an "ozone spray" (Messrs. Softal, Hamburg) immediately above the nip.

(c) Tests

The oxidation of the free $PE_3$ surface of the laminate was tested in accordance with the following paint test: A test paint was first prepared from Duralin Red (Duralin paint 49978, test paint for testing polyethylene film pre-treated for printing, Messrs. G-MAN, P.O. Box 49, S 23101, Trelleborg, Sweden) and ethyl alcohol in a mixing ratio of 1:1 and was applied to the PE-coated substrate surface at right angles to extrusion direction, using a brush. After a drying time of 20 minutes (room temperature) a transparent adhesive tape was stuck on and pressed free from air bubbles. To value the degree of oxidation, the transparent adhesive tape was stripped off rapidly.

The intensity of the stripping noise and the residue of the paint on the PE surface are a measure of the degree of oxidation. Three stages of oxidation are differentiated between:

| | |
|---|---|
| slight stripping noise | ⎫ |
| | ⎬ no oxidation |
| no paint residue on the PE | ⎭ |
| medium stripping noise | ⎫ |
| | ⎬ medium oxidation |
| slight paint residue on the PE | ⎭ |
| loud stripping noise | ⎫ |
| | ⎬ severe oxidation |
| no detachment of the paint from the PE | ⎭ |

The "neck-in" was determined by measuring the coating width ($PE_3$) on the coated substrate and calculating the difference: die width-coating width.

The aluminium/$PE_3$ bond strength (BS) was determined with the aid of a Kleefkracht meter (Messrs. Paramelt-Syntac B. V., P.O. Box 392, 2000 AJ/Haarlem, The Netherlands), as the "O" value immediately after coating and at appropriate intervals of time on 25 mm test strips, as BS (dry) and as BS (wet) (after storage—20 seconds in water at 70° C. and then 10 seconds in water at room temperature) (data in p/25 mm).

12 samples (25 mm test strips) were taken at uniform intervals over the laminate width. Of the 4 samples from the centre of the laminate (measurement points 5–8), the arithmetic average (BSm 5–8) was calculated and plotted diagrammatically against the time (compare E. Prinz, Kunststoff-Journal, October 1974, page 15).

(d) Results of Examples 1–5

Figure 2:
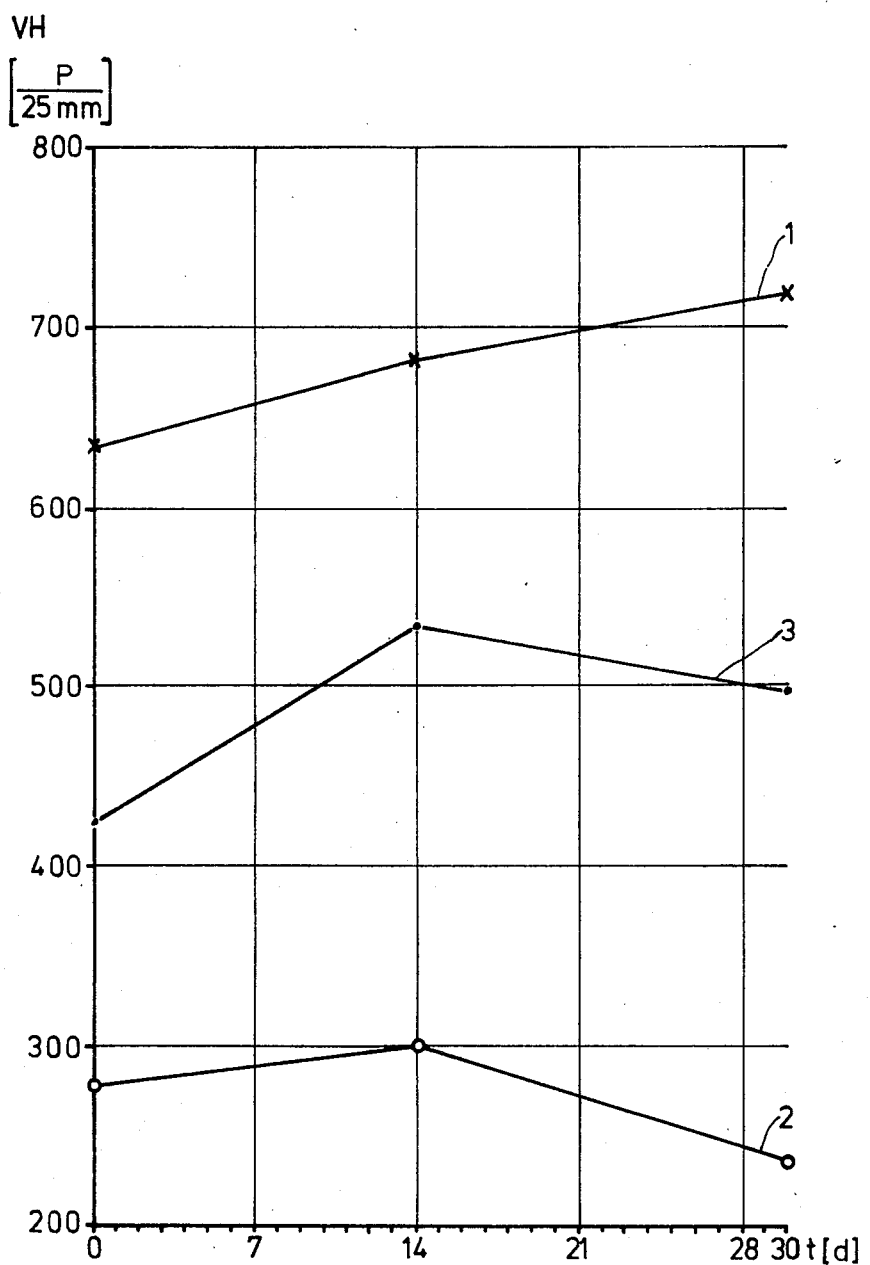
FIGS. 2 and 3 are graphs showing test results of Examples 2 and 3.
Figure 3:
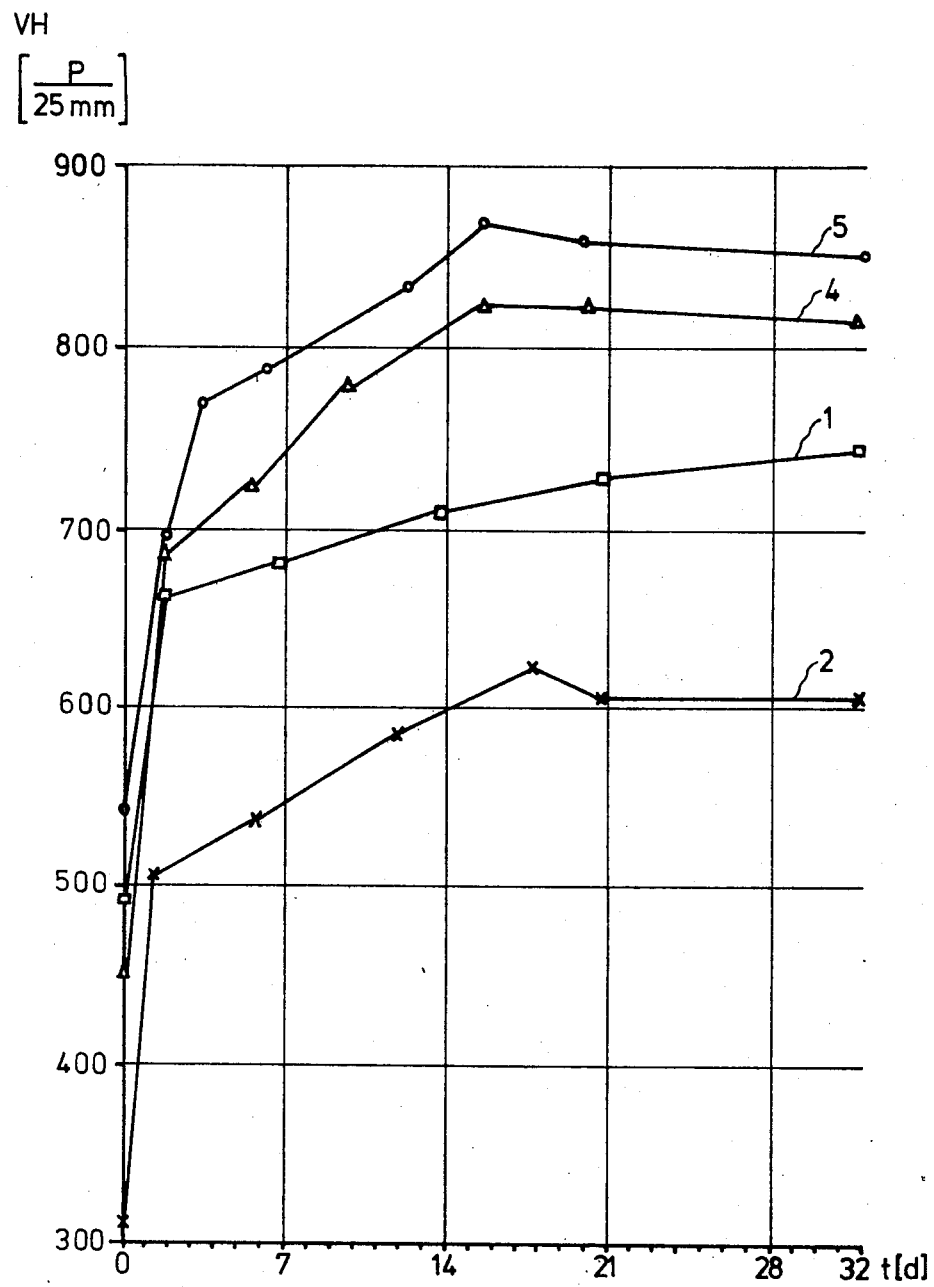

The test results are summarised in Table 2 and FIGS. 2 and 3. Compared with Examples 2 and 3, Example 1, which demonstrates the process according to the invention, has the highest wet bond strength (compare FIG. 2) and a "neck-in" value which remains below the limit of 50 mm which is acceptable in practice (compare Table 2).

Comparison of Example 1 with Examples 2, 4 and 5 also shows that, in the sequence Example 2, 1, 4, 5, both the bond strength, given as dry bond strength in Diagram 3, and the "neck-in" (compare Table 2) rise with increasing temperature profile $\Delta T$ (compare Table 1).

Accordingly, related to the total number of the requirements, and especially with regard to bond strength, "neck-in" and oxidation, Example 1 is the optimum result.

TABLE 2

| Example | MI g/10 min. | Density g/cm³ | Oxidation the $PE_3$ surface | "Neck-in" mm | Bond Strength[1] | |
|---|---|---|---|---|---|---|
| | | | | | wet p/25 mm | dry p/25 mm |
| 1 | 7.2 | 0.9184 | medium | 48 | 600 | 700 |
| 2 | 6.7 | 0.9180 | medium | 40 | 300 | 600 |
| 3 | 6.9 | 0.9162 | medium | 38 | 500 | |
| 4 | 7.6 | 0.9190 | medium | 54 | | 800 |
| 5 | 7.6 | 0.9192 | medium | 56 | | 800 |
| | | | | | see FIG. 2 | see FIG. 3 |

[1]approximate average values given

What is claimed is:

1. Process for the production of laminate systems with improved bond strength by coating flexible substrates using, as the coating resin, low density polyethylene (LDPE) which has been prepared in autoclave reactors with virtually complete back mixing under pressures of 800 to 3,000 bars and in the presence of initiators which form free radicals, characterized in that a low density polyethylene which is obtained if
   (a) two autoclaves are connected in series such that all the reaction product of the first reactor is transferred to the second reactor,
   (b) a length-/diameter ratio (L/D) of 1:1 to 3:1 is chosen for each autoclave,
   (c) The monomer feed stream is distributed between the two reactors such that the monomer feed stream to the first reactor is the same as or greater than the monomer feed stream to the second reactor,
   (d) the reaction temperatures in the two autoclaves are adjusted such that the reaction temperature in the first reactor is lower than the reaction temperature in the second reactor,
   (e) the initiator chosen for the first reactor is the same as or different from the initiator chosen for the second reactor,
   and which has a density of 0.915 to 0.930 g/cm$^3$ and a melt index (190° C./2,16 kp) of 0.2 to 20 g/10 minutes is employed as the coating resin,
   and said flexible substrate is coated with a composition consisting essentially of said low density polyethylene.

2. Laminate systems with improved bond strength produced by coating flexible substrates with a composition consisting essentially of a low density polyethylene (LDPE) prepared in autoclave reactors with virtually complete back mixing under pressures of 800 to 3,000 bars in the presence of initiators which form free radicals, by a procedure in which
   (a) two autoclaves are connected in series such that all the reaction product of the first reactor is transferred to the second reactor,
   (b) each autoclave has a length-/diameter ratio (L/D) of 1:1 to 3:1,
   (c) the monomer feed stream is distributed between the two reactors such that the monomer feed stream to the first reactor is the same as or greater than the monomer feed stream to the second reactor,
   (d) the reaction temperatures in the two autoclaves are adjusted such that the reaction temperature in the first reactor is lower than the reaction temperature in the second reactor,
   (e) the initiator for the first reactor is the same as or different from the initiator for the second reactor,
   and having a density of 0.915 to 0.930 c/cm$^3$ and a melt index (190° C./2.16 kp) of 0.2 to 20 g/10 min.

3. Laminate systems according to claim 2 produced by coating a flexible substrate containing an aluminium foil with a free aluminium surface with the LDPE described in claim 2.

4. Laminate systems according to claim 2 with a wet bond strength exceeding the value of 350 p/25 mm (initial value) or 500 p/25 mm (level 30 days after preparation), respectively.

5. Laminate systems according to claim 2 produced by coating with a LDPE described in claim 2 which has a density of about 0.916–0.919 g/cm$^3$ and a melt index of about 6–8 g/10 min.

6. Laminate systems according to claim 2 produced by coating with a LDPE described in claim 2 which has a density of about 0.922–0.924 g/cm$^3$ and a melt index of about 3–5 g/10 min.

* * * * *